United States Patent Office 2,952,550
Patented Sept. 13, 1960

2,952,550

REGENERATED CELLULOSE STRUCTURE AND METHOD OF MAKING SAME

A. Kenneth Parlour, Chicago, Ill., assignor to Tee-Pak, Inc., Chicago, Ill., a corporation of Illinois No Drawing. Filed Oct. 15, 1956, Ser. No. 615,765

14 Claims. (Cl. 99—176)

This invention relates to webs, sheets, tubes and other structural forms composed of cellulose which has been regenerated from viscose or other cellulose derivatives, and having a sheet or web of fibrous material such as paper, woven cloth and the like positioned within the regenerated cellulose.

Composite structures, especially in the form of tubes composed of cellulosic fibers and regenerated cellulose—particularly, the tubular forms known in the sausage art as fibrous casings—have been made, up to the present time, essentially by a technique which involves forming, from a web of paper, a tube around a mandrel, then forming a seam by squirting a stream of viscose between the overlapped edges of the web, while simultaneously extruding viscose around the outside of the tube, passing the tube through a coagulating bath and a regenerating bath and then washing and drying the resulting product. Such tubular products—fibrous casings, as they are called in the art—have been widely used as containers for Bologna and other types of sausage, in place of natural gut casings, and comprise an important volume of total synthetic sausage casing production in this country.

The above described tube-producing process, though used commercially for making fibrous casings possesses features and characteristics which make the procedure expensive and highly inflexible, requiring having on hand much interchangeable, costly equipment in order to meet the demand for various sizes of casings. Furthermore, because of the aggravating problems of gas removal, tube washing and drying, present commercial manufacturing processes have been limited to speeds of 20 feet per minute or slower.

Though it would be desirable to eliminate the costliness, and slowness of the currently used commercial process by working with a flat web which could easily be coated and then seamed, no seaming means has been found—up to the present time—which would make a seam good enough to be practical for use in sausage casing. Thus, complete failure has uniformly followed all prior attempts to produce cellulosic tubes, e.g., fibrous casing which could be "wet-stuffed," when production of the tubes involved forming a tube from a web and seaming the tube edges with adhesives such as urea-formaldehyde, alkyd resins, epoxy resin type varnishes, vinyl adhesives, cross-linking vinyl copolymers and other materials of this type.

Invariably, subjecting such tubes to wetting, stuffing while wet, smoking, high temperatures and the other processing steps or conditions associated with sausage manufacture resulted in rupturing the tube at or near the seam.

Not only must a special sausage casing of this type be able to withstand extremely high pressures and other drastic conditions just noted, as it is being stuffed wet, without breaking, but it must in addition, desirably exhibit a minimum of distortion or variation in stuffed diameter.

It may be noted here that in the production of sliced sausage which is to be sold in what is known as prepackaged form—the now familiar small, clear-film covered packages found at all meat counters—it is necessary that the shaped or formed sausage from which slices are to be taken must have variations in its diameter restricted to pre-selected close tolerances, to permit the packer to package sliced sausage of uniformly constant weight, and slice count.

It is principally for reasons such as the foregoing that a real need exists in the art for a more flexible, cheaper and speedier process for making fibrous casing and similar products.

I have now developed, and the present invention is directed to, a novel process wherein paper of the type used for producing fibrous casing (namely, a porous highly absorbent sheet which, as received from the manufacturer, has been treated, preferably, by application thereto of a thin coating of viscose which has then been regenerated) is coated, as a flat web, at relatively high speed with a cellulose derivative such as viscose or a cellulose ester or mixture of esters, or a nitrate, followed by regeneration of the cellulose, and seaming of the edges of the web to form a tube of any desired diameter. Where the cellulose derivative is an ester, or mixture of esters, the seam is formed before regeneration of the cellulose. My process eliminates problems of gas removal, tube washing and drying, permits the high speed fabrication of fibrous casings, of any size, with simplicity and economy.

My invention also makes possible, for the first time, the production of cellulosic tubes which are not merely suitable for use as sausage casings but which are superior in many respects to the presently available "fibrous casings." One of the particularly outstanding features of my invention is that I can produce fibrous casings which are substantially smoother, on the inside, than are the presently available fibrous casing, and to which meat emulsion does not adhere to any substantial degree. Another feature is that pellicles, especially in seamed tube form, having a porosity which is substantially greater than that of cellophane can be produced.

These and various other aspects of my invention will be illustrated, in detail, in the following examples.

*Example 1*

A solution of cellulose acetate (type E–398–3 containing 39.8% acetyl) was made up to contain approximately 22% solids in equal parts of acetone and methyl ethyl ketone. This solution was coated onto Dexstar No. 66 VT 11.75 pound paper, the excess solution being removed by passing the paper between two glass rods spaced 0.022 inch apart; the coating was then dried at 175° F. The product was found to have a dry weight of 9.48 grams per sq. ft., as compared with 1.78 grams per sq. ft. for the uncoated paper. Applying a hot bar at a temperature sufficient to soften the cellulose acetate across the overap of such paper resulted in a heat-seal and after subjecting the resulting tube to 5% caustic soda in 75% methanol for hydrolysis of the acetate to take place, a reasonably strong seam resulted. Even stronger seams were obtained when the overlaps were wetted with acetone before the heat sealing step.

It was also found that seams of exceptional strength were formed by placing a 0.001 inch thick ribbon of cellulose acetate between the laps, before heat-sealing.

Similar products were made following the above procedure except that the coating was dried at 120° F.

The coatings were also modified by adding to the solutions thereof various plasticizers such as, triethyl citrate and acetyl triethylcitrate, to modify the softness and hand.

Example II

The following composition was prepared:

| | Percent |
|---|---|
| Cellulose acetate | 20 |
| Triethyl citrate | 4 |
| Acetyl triethyl citrate | 1 |
| Acetone | 75 |

The above solution was coated onto Dexstar No. 67 T–18–V viscose treated paper, the coating and drying techniques being similar to those of Example I above. The uncoated paper was found to have a bone dry weight of 1.94 grams per square foot, and the weight when coated with the above solution was 8.0 grams per square foot; after hydrolysis the weight was found to be 5.1 grams per square foot.

Portions of this coated paper were formed into tubes having six inch flat widths and a one-fourth inch overlap at the seams. Some of the seams were made by heat-sealing with a heated bar; the others were made by applying to the overlap a two percent solution of the above described coating dope, after which the tubes were immersed in a caustic-methanol bath for 15 minutes at 25° C. They were then dipped for two minutes in two percent sulfuric acid, washed for 15 minutes and finally plasticized by immersion in a tank containing 12 percent glycerol, before drying at room temperature.

The tubes were then cut into 20 inch lengths and stuffed with Bologna emulsion at a packing house, thus demonstrating that the strength of the seams was excellent.

Example III

To illustrate the feasibility of pigmenting casing made by this process, a small quantity of the solution used in the foregoing coating test was colored with Klondike Yellow X-2261, the mixing being done in a Waring Blendor. Films were cast on the same paper as used above, allowed to dry at room temperature; when seamed and regenerated as described above, a strong colored casing with excellent stuffing characteristics resulted.

The pigmenting of the casing demonstrates another phase of the versatility of the present processing. Besides pigmenting, it is also possible of course, to print on the paper before coating it so that the design is sealed between layers of coating. A further possible application is that of printing on the cellulose ester coating with a cellulose ester base ink, the ink then becoming an integral part of the casing after hydrolysis.

Example IV

A one-pound quantity of far-hydrolyzed cellulose acetate containing 24.5% acetyl was dissolved in a mixture containing 35% water and 65% methanol; the addition of about 10% ethyl lactatae produced a clear homogeneous solution which was then coated onto "fibrous" paper in a coating tower at a speed of 3.96 ft. per min, and dried at 340° F.

A numbere of 22 inch lengths of the thus treated paper were formed into tubes using the coating solution as an adhesive for the overlap, and the cellulose was regenerated by immersion of the tubes in 5% sodium hydroxide in 75% methanol. The casings were then washed in water, plasticized with glycerol and dried. A number of these casings were stuffed with sausage emulsion and processed at a packing plant; they were found to have excellent performance qualities, no distortion or seam bursting taking place.

I wish to point out here that the use of far hydrolyzed cellulose acetate in the making of fibrous casings in accordance with my invention has a number of advantages over the use of cellulose triacetate in that a lower cost solvent is possible, shorter regeneration time is required, and smaller amounts of regenerating chemicals are needed.

Example V

Following the procedures described in U.S. Patent No. 2,253,157, a number of cellulose formate dopes were made using zinc chloride and 90% formic acid. Coatings of such dopes were made on "fibrous paper" and some of the formic acid was allowed to evaporate. The coated paper was then put into cold city water to coagulate the formate film and then washed in cold water to remove the formic acid. The washed sheet was air-dried under tension by taping to a glass plate. The resulting sheet was trimmed to suitable size and formed into a tube, the overlapped edges being sealed together by softening the coating with 90% formic acid which was then allowed to evaporate. The tube was immersed in boiling water to regenerate the cellulose from the cellulose formate. The tube was plasticized with glycerol and dried using heavy glass rods to maintain transverse tension. In addition several tubes were made in which the boiling water treatment was not used so that casings of cellulose formate resulted. A number of tubes of each type were stuffed with Bologna emulsion, without incident, the casings performing in a highly satisfactory manner.

In general, it is believed that at least a 20% solution, and more preferably a 30% solution, of zinc chloride in formic acid should be used for producing cellulose formate which is to be used in the fabrication of tubes in the novel manner of this invention.

Example VI

A number of fibrous casings were made by coating flat paper with cellulose nitrate, forming a tube using a cellulose nitrate dope as an adhesive and finally converting the nitrate to cellulose in a bath of 5% sodium hydrosulfide in 50% ethanol, as follows:

A coating solution was made up to contain the following:

| | Percent |
|---|---|
| Cellulose nitrate type RS 30 to 40 seconds | 20.0 |
| Ethanol (contained in the cellulose nitrate) | 8.7 |
| Dibutylphthalate | 6.7 |
| Acetone | 64.6 |

The viscosity of the solution was estimated at about 130 to 150 poises.

A quantity of Dexstar No. 67 T–18Z viscose treated paper was coated with the above solution and dried at 120° F. The coating thickness was controlled by passing the coated web between parallel rods spaced 0.025 inch apart.

Using the above cellulose nitrate coating solutions as an adhesive 24 inch lengths of the coated paper were formed into tubular casings having flat width of 5$\frac{1}{16}$ inches. These casings were then immersed in a solution of 5% sodium hydrosulfide in 50% ethanol at room temperature, the pH of the solution being 8.5. After 3 hours of immersion qualitative tests showed only slight traces of residual nitrate in the casings, which were then washed thoroughly and plasticized by immersion in a 12% glycerol bath.

Bone dry weight in the various stages were as follows:

| | Grams per sq. ft. |
|---|---|
| Uncoated paper | 1.94 |
| Cellulose nitrate coated paper | 3.4 |
| Hydrolyzed casing | 3.2 |
| Regular fibrous (a sample of the commercial product) | 5.8 |

A number of the casings were stuffed out at a packing house and smoked in a normal manner. No difficulty was encountered during stuffing or smoking, and the stuffed sausages appeared satisfactory in all respects.

While cellulose formate, acetate, nitrate, and far-hydrolyzed cellulose acetate have been found to be effective in the practice of my invention it is to be understood, of course, that other soluble thermoplastic esters may be used. For example, beside the foregoing one can use cellulose propionate, cellulose butyrate, cellulose benzoate as well as mixed esters such as, cellulose acetate butyrate, cellulose acetate nitrate and cellulose acetophthalate.

*Example VII*

Fibrous casings prepared in accordance with the presently used commercial method were slit an inch or so from the viscose seal, the length of the tubes. 10 grams of acetate derivative cotton linters (50 second, 2.58 m ACS) were dispersed in 200 ml. of cupriethylene diamine (TAPPI Standard). Using this dispersion as an adhesive, the slit edges of the casings were overlapped and sealed to form tubes. After the longitudinal seals had been made and allowed to air dry, a short (quarter inch) "tongue" of film was shaped on one end of each tube and this was seamed with the dope. The structures were regenerated in 15% sulfuric acid containing a small amount of Duponol WA after which the casings were washed in hot water, plasticized with 15% glycerol and allowed to dry at room temperature while held under air inflation at low pressure. The casings were then stuffed with Bologna emulsion, the stuffer being instructed to fill the casings "tight." There was no evidence of either bench or smoke house breakage either at the seams or anywhere else.

*Example VIII*

Commercial fibrous casings were slit into strips three inches wide and about eight feet long. These strips were then folded lengthwise into tubes having $\%_{16}$ inch overlaps which were seamed with cellulose in cupriethylene diamine solution as before. The adhesive was regenerated in 15% sulfuric acid after which the casing was washed. A portion of the product was softened with glycerol and inflated until dry. The product had a uniform dry flat width of $12\%_{64}$ inches and was shirred without difficulty. The shirred strands were stuffed, linked and processed, including dyeing the wieners in a Jourdan cooker, without breakage.

The remaining portion of the product was dyed by the process described in U.S. Patents Nos. 2,477,767 and 2,477,768, before drying and shirring. These strands were also stuffed and processed in a normal manner, the dye in the casing transferring to the wieners, thereby making a separate dyeing operation unnecessary.

The application of the techniques of my invention to the production of casings shirred in accordance with the procedures described in U.S. Patents Nos. 2,723,201; 2,722,714; and 2,722,715 is included. Fibrous casings, i.e., reinforced casings made in accordance with my invention having size limitations substantially outside those recited in the foregoing patents can now be made and shirred. It is also pointed out that the great strength of the reinforced casings permit a reduction in wall thickness, which results not only in a saving of material but also makes shirring easier to carry out.

Besides the fine utility of casings of the foregoing size in the production of skinless wieners, the tubes make excellent dialysis membranes.

Besides shirring, these and larger or smaller casings made in this way can be surface-dyed with naphthol dyes; the surfaces can also be printed.

Embodiments of my invention illustrating the use of additional sealing media are found in the following examples.

*Example IX*

An apparatus such as is commonly used for continuously forming flat webs of thermoplastic material into tubes by heat sealing together the opposite edges, as described, for example, in U.S. Patent No. 2,330,446, was set up with the addition of a small nozzle, so arranged as to permit applying a continuous thread of liquid adhesive between the overlapping edges just before they contacted each other. A reservoir and tubing was also provided for feeding to this nozzle a supply of cupriethylene diamine solution (TAPPI Standard) in water. A tank was also provided so that the paper tube could, immediately after its formation, be passed continuously through a bath consisting of 15% sulfuric acid. A quantity of fibrous casing prepared in accordance with the presently used commercial method was slit at each edge and the opposing sides were separated and rewound to provide two rolls of flat paper webbing coated with regenerated cellulose. The webs had a width of $6^{15}/_{16}$ inches. One of these webs was threaded through the above described apparatus which was adjusted to form the web into a tube having a $\%_{16}$ inch overlap.

By this means a paper tube coated with regenerated cellulose was seamed by means of the cupriethylene diamine continuously, at a speed of 7.5 feet per min. The tube, after passing through the acid bath to coagulate the cellulose dissolved by the solvent, was washed in water and dried while inflated with air.

The tubing so produced did not burst when inflated with air to a pressure of 20 p.s.i. and was entirely suitable for use as a sausage casing.

*Example X*

Using the same equipment described in the foregoing sample and a similarly prepared web of cellulose coated paper a continuous tube was formed using as the sealant instead of cupriethylene diamine, a solution containing 25% calcium thiocyanate and 25% calcium chloride in water. The sealant was then decomposed by immersion of the tube in a sulfuric acid bath somewhat more dilute than that described in the foregoing example. When washed and dried the product was very strong and performed excellently as a sausage casing for Bologna.

*Example XI*

Commercial fibrous casing which had been slit was reformed into tubing by sealing lengthwise using the equipment described in Example IX. A cellulose solvent consisting of a 75% aqueous solution of zinc chloride was applied between the overlapped edges of the casing, the edges were pressed together and the solvent washed out by passing the tubing through a bath of plain water. The tubing was then plasticized with glycerol and subsequently dried while inflated to give a seamed tube having excellent strength. The zinc chloride solvent was found to react very rapidly permitting strong seams to be formed at speeds as high as 86 ft. per min.; even higher speeds can be achieved. The presence of free acid in the commercial grades of zinc chloride, is sometimes undesirable; it may be removed by the addition of sufficient metallic zinc to react with the excess acid. The concentration of zinc chloride used in accordance with this invention should be in excess of around 60%.

*Example XII*

The procedure described in the foregoing example was repeated with the exception that the solvent used was a 50% aqueous solution of benzyl trimethyl ammonium hydroxide which was subsequently decomposed by immersion in dilute sulfuric acid. After washing out the acid the product was found to have very good strength.

Besides the solvent solutions referred to in the foregoing examples other cellulose solvents may be used including mineral acids, especially phosphoric (syrupy) and sulfuric, the latter being preferably used in concentration between about 60% and 66%; other thiocyanates such as those of aluminum, sodium or other metals; metal chlorides, particularly, aluminum chloride; strong alkalis such as sodium or potassium hydroxide; quaternary ammonium compounds and metal complexes such as, cuprammonium hydroxide. Examples of other materials useful for this purpose are: Highly polar compounds such as quaternary ammonium compounds with molecular weights generally over about 150, including tetramethyl ammonium hydroxide, trimethyl benzyl ammonium hydroxide; dimethyl dibenzyl ammonium hydroxides; guanidinium hydroxide; trialkylsulfonium hydroxides. Phosphonium, arsonium and selonium bases can be used. These and the other cellulose solvents can be used "straight," or containing cellulose dissolved therein.

While paper is a generally preferred base for impregnation with viscose or with a cellulose ester followed by regeneration, cloth can also be used. Where sausage casings are concerned, the advantage of cloth lies in its great strength and in the fact that stitched natural casings may be replaced by such a product. In the following example cloth was coated on both sides with viscose, which was subsequently regenerated. Casings were then made from these materials, both by stitching and by seaming with cellulose dissolved in cupriethylene diamine solution, to produce products which were found to be exemplary in performance when stuffed and processed.

Example XIII

Several pieces of muslin filter cloth (64 by 56 thread count) were rinsed in warm water to remove sizing and then immersed in viscose before being passed between glass rods to remove the excess. The cellulose was regenerated and the coated cloth washed, softened with glycerol and dried under tension.

The dried material was trimmed to suitable size and formed into tubes; two of the tubes were seamed using a dispersion of cellulose in cupriethylene diamine as previously described. Other cloths were stitched in the manner of natural casings. The muslin reinforced casings were stuffed and processed in a packing house and proved to be strong and completely satisfactory. The stitched products were also quite satisfactory. The stitched product has definite advantages over stitched natural casings with respect to cost, uniformity, a reliable raw material supply, the ability to accept oil-base printing inks (which could be applied to the continuous web before stitching), and in that dry shipment (permitted by my product) offers considerable freight advantages, as well as allowing easier handling and storage.

Casings made in accordance with my invention may incorporate a tear string in order to facilitate quick opening of the casings. In connection with the foregoing the casings were produced having cotton string fastened to the inside of the casing, the casing being subsequently stuffed and processed. It was found that the resulting casing could be split for its entire length, readily, by pulling on the string, as described in the following example.

Example XIV

A length of No. 8 gauge cotton thread was immersed in a 3 percent dispersion of chemical cotton in cupriethylene diamine solution. The thread was removed with a fairly heavy coating of the dispersion and inserted lengthwise into a 4 foot long section of fibrous casing. The thread was pressed against the inside wall of the casing for a few minutes to allow the adhesive to set. The cellulose of the adhesive was then regenerated by immersing the casing in 15 percent sulfuric acid for about 10 minutes after which the casing was washed, softened with glycerol and dried under tension.

A 22 inch length of the casing was stuffed and processed without incident. After removing the tie string from the end of the sausage the casing could be slit by pulling down the string.

It is to be understood, of course, that the foregoing means used in attaching the tear string inside the casing is not the sole means possible. Thus a viscose coated string can be continuously applied to the inside wall of the casing as it is being formed, as in the present commercial process; it is even less difficult to apply such a string to the inside of a casing being formed from a previously coated web, whether the coating be cellulose or a derivative such as the acetate, nitrate or formate. Furthermore, such a string may be similarly applied to the inside of un-reinforced casings.

The concepts of the present invention are by no means limited to the production of tubes, casings or similar structures, but have wide applicability wherever a strong paper or other fiber or fabric reinforced sheet, film or the like is required. In this connection I have made satisfactory abrasive paper by coating fibrous paper or similar backing material with abrasive-containing viscose and regenerating in known manner. More particularly I have prepared a very satisfactory abrasive paper by mixing Carborundum with viscose, coating the mixture onto paper of the type used in fibrous casing, and subsequently regenerating, softening, and drying the viscose-coated paper.

As used in the specification and claims, the term "fibrous paper" has reference to lightweight, unbleached bast fiber paper of high porosity and freeness, which has exceptional absorbent power and is easily penetrated by viscose dopes. The preferred paper represented by the "Dexstar" papers set forth in the foregoing specific examples, is made of hemp fibers; after the sheet is formed, a very light coating of viscose is applied followed by regeneration. The dried paper has adequate strength in the presence of strongly alkaline viscose.

Other materials besides the above which can be used as the base sheet are: non woven-cloth and woven cloth formed of sisal, ramie, flax, bagasse and cotton. It is desired that the paper or cloth be porous enough so that it can be impregnated with viscose.

Besides the foregoing base sheet materials, I can produce casings from paper such as parchment paper, from regenerated cellulose, or from the products described in U.S. Patent No. 2,744,292, with or without additional coating, by using cellulose solvents such as those hereinbefore described, for producing the requisite seal.

To increase the "bite" of the solvents, wetting agents which are compatible with the various treating chemicals used may be employed.

A particularly useful feature of my invention is that I can alter the thickness of the cellulose coating, to provide for example, a tube having a thick layer on the inside and a thinner layer on the outside, or vice versa, if desired.

Also tubes can be produced by treating the web, from which the tubes are to be fabricated, with coatings so as to provide, for example, a tube with a moistureproof coating on the inside, and no coating or a different coating on the outside.

While in the foregoing examples, the seaming operation has been specifically applied to the fabrication of tubes, it is understood, of course, that cross-seams can be made in addition to the side seams, whereby to produce a bag suitable as a container for foods which are to be frozen, cooked or otherwise processed in situ.

Insofar as seaming is concerned, and by way of summarization of the foregoing examples, seams may be formed in paper or cloth coated with a cellulose ester by use of (1) a solvent for the ester coating, the solvent being applied to the seam area in such strength and for such time as to "bite" the coating; (2) by use of ester dissolved in the solvent, application made as in (1); (3) by use of heat seals produced by conventional apparatus and using the technique used in making thermoplastic film bags; (4) a heat seal step with prior application at the seam area of an ester ribbon; (5) extrusion of molten resin flake at the seam, followed here as in the preceding cases by hydrolysis; seams may be formed in cellulose coated paper or cloth by use of a solvent for the cellulose which solvent may or may not contain dissolved cellulose.

Other products besides fibrous casings can be made from sheets or webs impregnated with a cellulose derivative and subsequently regenerated. For example, the viscose or other cellulose derivative applied to the woven or non-woven fabric may have air incorporated into it, either by beating air therein or by incorporating soluble salts into the viscose, as in the manner described in U.S. Patent Nos. 2,671,743 and 2,665,450, to produce a spongy material. Such a sponge has great transverse and lateral strength compared to the products of the prior art. Besides abrasives, which have been already mentioned, other additives which can be included in the viscose or other cellulose derivative prior to regeneration are oils such as lemon oil, rubbing agents, cleaning agents, soaps and the like to provide polishing and scouring washing cloths or sponges. Of course, the "sponge" effect can be on one or both sides of the web.

The additions of silica gel particles or similar particles to the sheet or web imparts a surface which is suitable for movie screens. Pigments too, can be added, using preferably viscose stable pigments, such as titanium dioxide, carbon black, iron oxide, and chrome green to mention a few. The application of medicaments of one kind or another, sulfa drugs and the like, to the viscose, particularly, of the type which is made spongy by beating air into it, provides a material suitable for bandages. The insulating character of such a product would also make it suitable as a wrapping for cold water pipes, particularly, with the addition of a material such as asbestos and an adhesive backing for strength.

Insecticides may be dispersed in the viscose prior to its regeneration, as can corrosion inhibitors, pesticides and the like. Flame retardants can be also added to make these materials suitable for drape materials using the well-known flame retardant materials such as phosphates, sulfamates and so on. Fibrous sheets, in accordance with this invention, may be used as wall coverings and the like.

And, of course, the finished product—that is, with the surfaces composed of regenerated cellulose—can be partially acetylated or partially nitrated to make it more resistant to rough usage.

The web of this invention can also be used as a carrier for other chemicals than those mentioned, the application of the chemical being uniformly controlled so that a given unit area or weight of material would represent a given amount of such chemicals.

Ion exchange resins could be incorporated into the viscose prior to, at the time, or after air is beaten into it and in any event prior to regeneration of the viscose; after use the product could then be regenerated by placing it in a salt bath.

I claim:

1. The method for producing a cellulosic structure in the form of a tube composed of a fibrous component and a regenerated cellulose component which comprises forming into tubular form, with the longitudinal edges overlapped, a sheet or web of a fibrous material which has been integrated with regenerated cellulose, applying as a cellulose solvent an aqueous zinc chloride solution of concentration greater than about 60% to said overlapped edges to at least soften the cellulosic material thereof, contacting said solvent-softened edges to form a seam of said tube, and then removing the solvent therefrom.

2. The method of producing a cellulosic structure in the form of a tube composed of a fibrous component and a regenerated cellulose component which comprises forming into tubular form, with the longitudinal edges overlapped, a sheet or web of a fibrous material which has been integrated with regenerated cellulose, applying as a cellulose solvent an aqueous solution containing calcium thiocyanate and calcium chloride to said overlapped edges to at least soften the cellulosic material thereof, contacting said solvent-softened edges to form a seam of said tube, and then removing the solvent therefrom.

3. The method of producing a cellulosic structure in the form of a tube composed of a fibrous component and a regenerated cellulose component which comprises forming into tubular form, with the longitudinal edges overlapped, a sheet or web of a fibrous material which has been integrated with regenerated cellulose, applying as a cellulose solvent an aqueous solution of cupriethylene diamine to said overlapped edges to at least soften the cellulosic material thereof, contacting said solvent-softened edges to form a seam of said tube, and then removing the solvent therefrom.

4. The method of producing a cellulosic structure in the form of a tube composed of a fibrous component and a regenerated cellulose component which comprises forming into tubular form, with the longitudinal edges overlapped, a sheet or web of a fibrous material which has been integrated with regenerated cellulose, applying as a cellulose solvent aqueous sulfuric acid of a concentration between 60% and 66% to said overlapped edges to at least soften the cellulosic material thereof, contacting said solvent-softened edges to form a seam of said tube, and then removing the solvent therefrom.

5. The method of producing a cellulosic structure in the form of a tube composed of a fibrous component and a regenerated cellulose component which comprises forming into tubular form, with the longitudinal edges overlapped, a sheet or web of a fibrous material which has been integrated with regenerated cellulose, applying as a cellulose solvent syrupy phosphoric acid to said overlapped edges to at least soften the cellulosic material thereof, contacting said solvent-softened edges to form a seam of said tube, and then removing the solvent therefrom.

6. The method for producing a cellulosic structure in the form of a tube composed of a fibrous component and a regenerated cellulose component which comprises applying to at least one face of a sheet or web of fibrous material a coating of a cellulose ester, forming said sheet or web into tubular form with the longitudinal edges overlapped, effecting a heat seal between said overlapped edges to form a seam of said tube, and then hydrolyzing the said ester to regenerate the cellulose.

7. The method for producing a cellulosic structure in the form of a tube composed of a fibrous component and a regenerated cellulose component which comprises applying to at least one face of a sheet or web of fibrous material a liquid dispersion of a cellulose ester drying said sheet or web, forming said sheet or web into tubular form with the longitudinal edges overlapped, applying to said overlapped edges a solvent for the ester to at least soften the latter, contacting said solvent softened edges to form a seam of said tube, removing the solvent therefrom and hydrolyzing the ester to regenerate the cellulose.

8. A method for producing a cellulosic structure in the form of a tube composed of a fibrous component and a regenerated cellulose component which comprises applying to at least one face of a sheet or web of fibrous material a liquid dispersion of a cellulose ester, drying said sheet or web, forming said sheet or web into tubular form with the longitudinal edges overlapped, applying a solution of the ester to said overlapped edges, contacting said edges to form a seam of said tube, removing the solvent therefrom, and then regenerating the cellulose from said ester.

9. A method for producing a cellulosic structure in the form of a tube composed of a fibrous component and a regenerated cellulose component which comprises applying to at least one face of a sheet or web of fibrous material a liquid dispersion of a cellulose ester, drying said sheet or web, forming the said sheet or web into tubular form with the longitudinal edges overlapped, applying between said overlapped edges a ribbon formed of the same ester, effecting a heat seal between the said edges having the ester ribbon therebetween, and then contacting the resulting seamed tube with a hydrolysis medium whereby to regenerate the cellulose from said ester.

10. The method of producing a cellulose tube which comprises forming a sheet or web of cellulosic material into tubular form with the longitudinal edges overlapped, applying a cellulose solvent containing dissolved cellulose to said overlapped edges to at least soften the cellulosic material thereof, contacting said solvent-softened edges to form a seam of said tube, permitting the overlapped seamed edges to dry, and then contacting the seamed portion with a cellulose regenerant to regenerate the cellulose which had been dissolved in the said cellulose solvent.

11. A tube produced in accordance with the method of claim 1, having a relatively thick layer of regenerated cellulose covering the inner wall of said tube.

12. A tube produced in accordance with the method of claim 1, containing cellulose fibers and having a porosity substantially greater than cellophane.

13. A tube produced in accordance with the method of claim 6, having a relatively thick layer of regenerated cellulose covering the inner wall of said tube.

14. A tube produced in accordance with the method of claim 6, said tube containing cellulosic fibers and having a porosity substantially greater than cellophane.

References Cited in the file of this patent

UNITED STATES PATENTS

| | | |
|---|---|---|
| 1,829,702 | Goodman | Oct. 27, 1931 |
| 2,119,729 | Walter | June 7, 1938 |
| 2,137,904 | Walter | Nov. 22, 1938 |
| 2,182,188 | Walter | Dec. 5, 1939 |
| 2,210,436 | Weingand et al. | Aug. 6, 1940 |
| 2,686,128 | Conti | Aug. 10, 1954 |
| 2,723,201 | Blizzard et al. | Nov. 8, 1955 |
| 2,773,773 | Harder et al. | Dec. 11, 1956 |
| 2,845,357 | Milne | July 29, 1958 |